Figure 5:
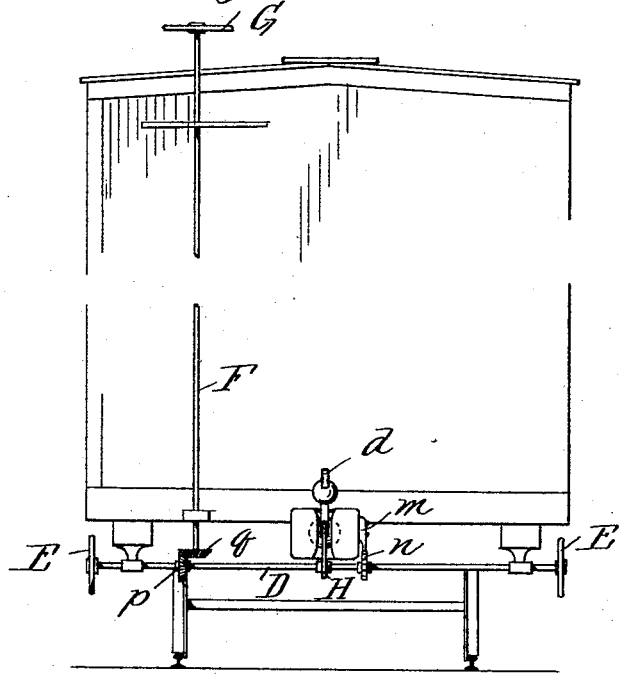

(No Model.) 2 Sheets—Sheet 1.
W. HOLLY.
CAR COUPLING.
No. 484,430. Patented Oct. 18, 1892.
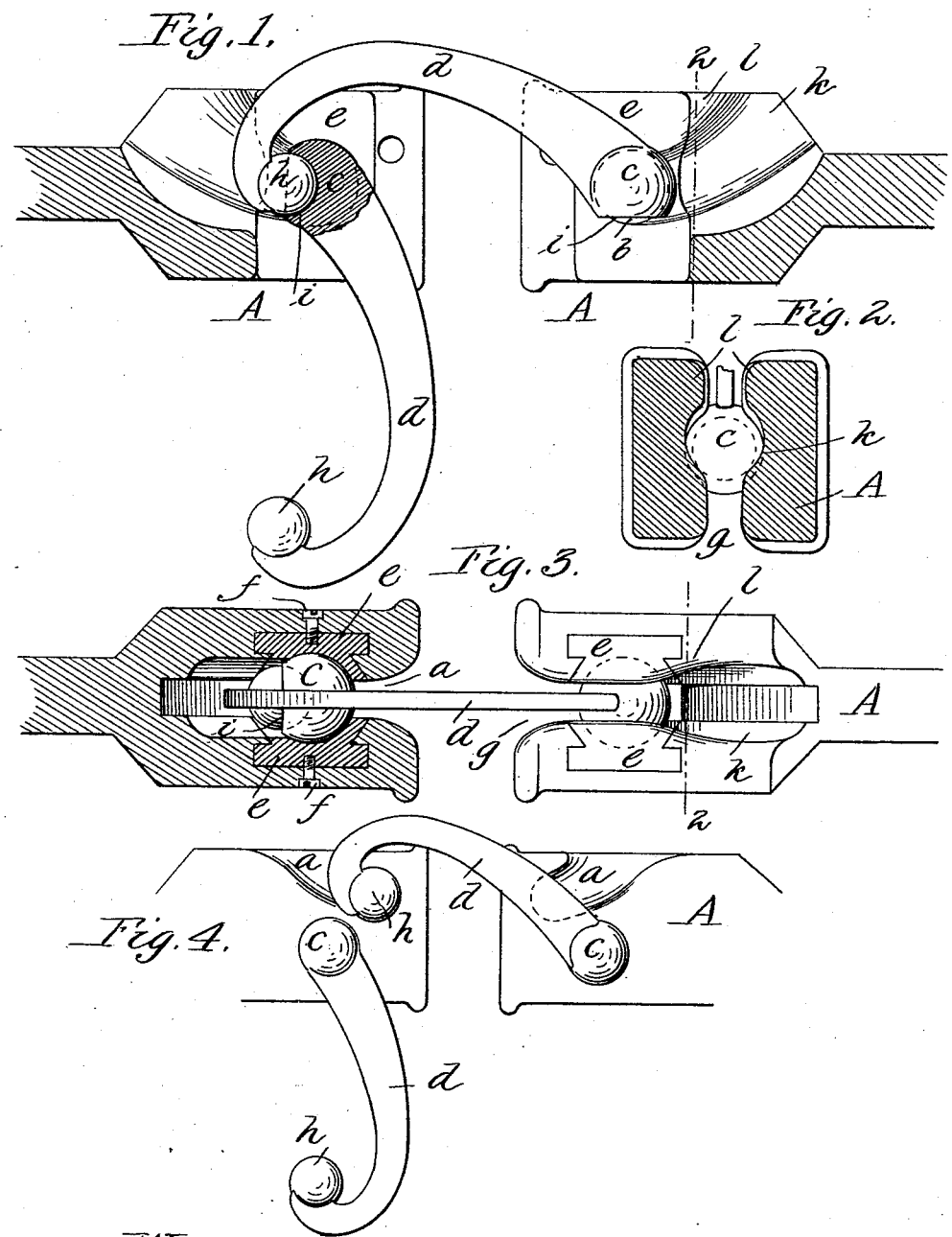
Witnesses
Gales P. Moon
Ford T. Schneider
Inventor
Willis Holly
by Charles L. Sturtevant
Attorney.

(No Model.) 2 Sheets—Sheet 2.

W. HOLLY.
CAR COUPLING.

No. 484,430. Patented Oct. 18, 1892.

Witnesses
Gales P. Moore
Ferd. T. Schneider

Inventor
Willis Holly
by Charles L. Sturtevant,
Attorney.

UNITED STATES PATENT OFFICE.

WILLIS HOLLY, OF WASHINGTON, DISTRICT OF COLUMBIA.

CAR-COUPLING.

SPECIFICATION forming part of Letters Patent No. 484,430, dated October 18, 1892.

Application filed January 18, 1892. Serial No. 418,433. (No model.)

*To all whom it may concern:*

Be it known that I, WILLIS HOLLY, a citizen of the United States, residing at Washington, in the District of Columbia, have invented certain new and useful Improvements in Car-Couplings, of which the following is a description, reference being had to the accompanying drawings, and to the letters of reference marked thereon.

My invention relates to improvements in car-couplings, and particularly to that class of couplings having a pivoted hook attached to each draw-head and fitting and catching into a suitable recess in the opposite draw-head.

The object of my invention is to provide a coupling which shall be simple in construction, but yet very effective in practice.

A further object is to provide a coupling which can be put into use even though the draw-heads on the cars to be coupled together be of different heights, the objection to a great many of the automatic couplers now in use being that in order to be used practically the cars must be of the same height from the ground.

A still further object of my invention is to provide such a coupling that while perfectly strong and secure under ordinary circumstances, yet in case a car should leave the track the coupling-hook would be released from the opposite draw-head and the cars become uncoupled.

The invention comprises, first, a coupling for cars and the like, comprising a suitable draw-head, a hook pivoted at one end therein, said draw-head being provided with a suitable recess for the reception of the hook on the opposite draw-head.

The invention consists, secondly, in the combination, with suitable draw-heads open at the front and top and having recesses, of hooks pivoted at one end in said recesses, the pivoted end of each hook being provided with a socket for the reception of the free end of the opposite hook.

The invention consists, thirdly, in the combination, with suitable draw-heads open at the front and top and having recesses, of hooks having ball-shaped ends fitting in said recesses and having their free ends also ball-shaped, the ball-shaped pivoted end of each hook being provided with a rounded socket for the reception of the ball-shaped free end of the hook.

The invention consists, fourthly, in the combination, with suitable draw-heads, each having a recess with flaring sides at the upper end and terminating in a bearing at the lower end, of hooks pivoted at one end in the bearing of the draw-head and having a socket in said pivoted end, the free end of each of said hooks being adapted to enter the flaring mouth of the recess in the draw-head and enter the socket in the pivoted end of the hook.

The invention finally consists in certain details of construction of the bearing for the hooks, in certain means for automatically tripping the hooks, and in various other matters hereinafter referred to in the appended claims.

Figure 6:
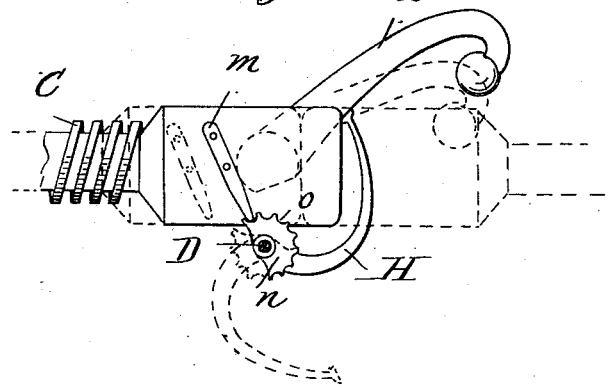

In the accompanying drawings, Figure 1 is a sectional side elevation of my invention. Fig. 2 is a section on line 2 2 of Fig. 1. Fig. 3 is a plan view, partly in section. Fig. 4 is a side elevation of my invention as applied to a double draw-head. Fig. 5 is an end view of a car, showing the means for holding the hook in its elevated position; and Fig. 6 is a side elevation showing the means for supporting and tripping the hook.

In the drawings, A A represent the draw-heads attached to the cars, the heads and their shanks being preferably, though not necessarily, made in one piece. Each head is formed with a recess $a$, in the sides of which recesses are formed sockets $b$, into which the ball-shaped ends $c$ of the hooks $d$ are set. Instead of forming the socket $b$ for the reception of the ball-shaped end $c$ of the hook $d$ in the sides of the recesses $a$, I may, and preferably do, provide a removable bearing, as $e$, formed of the two parts of metal or other suitable material and secure them within the recess by means of the screws $f$. By this construction when the bearing becomes worn it is only necessary to replace it with a new one instead of making a new draw-head, as would otherwise be necessary. The hooks $d$ are preferably made of the form shown and have rounded or ball-shaped rear ends $c$, adapted to fit in the sockets in the recesses $a$, above described. By this arrangement the hooks are pivoted within the draw-heads and are adapted to swing up and down, their downward movement to a vertical position being permitted by the central longitudinal slot $g$ in the bottom of the draw-head. The free end of each hook is provided with a ball or otherwise rounded, as at $h$, and is adapted to fit within a socket $i$ in the pivoted end of the hook on the opposite draw-head. It will thus be seen that, as shown in Figs. 1 and 3, only one of the coupling-hooks is used at a time—i. e., the one which it is not desired to use for coupling purposes is allowed to swing down to a vertical position and the opposite hook is caught into the socket in the rear end of the same.

In order to guide the free end of the hook into its bearing-seat in the recess of the opposite draw-head, the recess $a$ is made with a flaring mouth $k$ at the rear portion of the draw-head; but the top of said draw-head overhangs the recess near the front end, as shown at $l$, leaving only a narrow slot in the top of the head. By this construction when one of the hooks falls upon the coming together of two cars the free end will strike the flaring open mouth of the recess, and when the pull is exerted will be guided into the recess and down to its final position in the socket. It will also be seen that by having this flaring mouth to the recess and by making the sides of the draw-head adjacent to the mouth rounded, when two cars run upon each other, as is the case when one leaves the track, the hook will be forced out of the recess, and by the swerving to one side or the other the hook will ride off the draw-head and the cars become disconnected.

In Fig. 4 I have shown a double arrangement of draw-head. In this I simply provide the recess $a$ with a flaring mouth in each draw-head for the reception of the hook on the opposite head, so that both hooks can be used at the same time.

It will be understood that in the use of my coupling one of the hooks must be elevated, so that when the cars come together it can be lowered to enter the recess in the opposite draw-head. This lowering of the hook may be accomplished positively and be under the control of the brakeman to each car or may be controlled from the engine. It is preferable, however, to so construct the hooks that when in an elevated position they may, on the coming together of two cars, be automatically dropped into position. As a convenient means for accomplishing this object, I have devised the mechanism shown in Figs. 5 and 6. Referring to the latter figure, the draw-head is provided with the well-known buffer-spring C, which takes up the shock of the bumping of the cars and at the same time keeps the draw-head always in an extended position. This draw-head has secured to its side a pin or pawl $m$, adapted to mesh with the teeth $o$ on segment $n$, secured on a shaft D, supported in bearings on the car. The end of this shaft on either side of the car is provided with a hand-wheel E, whereby the shaft can be turned from the side of the car and through the beveled wheels $p\ q$ and vertical shaft F, with hand-wheel G, can be controlled from the top of the car. Beneath the center of the draw-head is secured to the shaft D an arm H, adapted to support the hook $d$ in an elevated position, the parts being in the position shown in full lines in Fig. 6, the hook $d$ having been elevated by turning the shaft D and causing the arm H to force up the hook, the parts being held in this position by the engagement of the pin with the segmental gear-wheel. Upon the coming together of two cars the draw-head is forced in. This carries the pin $m$ out of engagement with the teeth on the segment $n$ and allows the arm H, and with it the hook $d$, to fall, the latter engaging with the opposite draw-head.

Instead of controlling the operation of the hook by the bumping together of the draw-heads, I may place the same under the control of the air-brake or may substitute instead of the means shown any other suitable arrangement.

I preferably construct the draw-head so that it can also be used with the ordinary link-and-pin coupling, as well as with that herein shown.

I claim as my invention—

1. A coupling for cars and the like, comprising suitable draw-heads open at the front and top and having recesses, in combination with hooks pivoted at one end in said recesses, the pivoted end of each hook having a socket for the reception of the free end of the opposite hook, substantially as described.

2. In combination with suitable draw-heads open at the front and top and having recesses, hooks pivoted in said recesses, said hooks having a catch formed in their free ends, the pivoted end of each hook being provided with a socket for the reception of the catch on the free end of the hook, substantially as described.

3. In combination with suitable draw-heads open at the front and top and having recesses, hooks having a ball-shaped rear end and fitting in said recesses, said hooks having, also, rounded catches on their free ends, the ball-shaped pivoted end of each hook having a rounded socket for the reception of the rounded catch, substantially as described.

4. In combination with the hooks, the draw-heads having recesses with flaring mouths, contracted central portions, and enlarged lower portions forming sockets in the lower end of said recesses, in which sockets the hooks are pivoted, said recesses being also adapted to receive the free ends of the hooks, substantially as described.

5. In combination with the hooks, the draw-heads having recesses with flaring mouths, contracted central portions, and enlarged lower portions, said lower portions being provided with removable bearings forming sockets in the lower end of said recesses, in which sockets the hooks are pivoted, said recesses being also adapted to receive the free ends of the hooks, substantially as described.

6. In combination with the draw-heads, each provided with a recess having a flaring mouth and having a socket in its lower end, hooks pivoted at one end in the bearing of the draw-head and having a socket in said pivoted end, the free end of each of said hooks being adapted to enter the flaring mouth of the recess in the draw-head and enter the socket in the pivoted end of the hook, substantially as described.

7. In combination with a suitable movable draw-head, a hook pivoted therein, a pin attached to said draw-head, a shaft journaled on the car, a segmental gear-wheel on said shaft, the teeth of which engage with the pin when the draw-head is extended, and an arm secured to said shaft and adapted to support the hook when the latter is elevated, said hook being adapted to fall by its own weight when the draw-head is forced in and the pin released from the segmental gear-wheel, substantially as described.

In testimony whereof I affix my signature in presence of two witnesses.

WILLIS HOLLY.

Witnesses:
CHAS. C. HALPINE,
GALES P. MOORE.